United States Patent [19]

Hiyama

[11] Patent Number: 5,574,216
[45] Date of Patent: Nov. 12, 1996

[54] ROTARY DRUM CENTERING METHOD AND APPARATUS

[75] Inventor: Koji Hiyama, Tokyo, Japan

[73] Assignee: Sony Corporation, Japan

[21] Appl. No.: 375,996

[22] Filed: Jan. 20, 1995

[30] Foreign Application Priority Data

Jan. 24, 1994 [JP] Japan .................................. 6-023228

[51] Int. Cl.$^6$ ................................................. G01M 1/00
[52] U.S. Cl. ...................... 73/65.01; 73/65.07; 73/65.09; 360/104
[58] Field of Search ......................... 73/65.01, 66, 65.07, 73/65.09, 461; 360/104, 110

[56] References Cited

U.S. PATENT DOCUMENTS

| | | | |
|---|---|---|---|
| 1,864,677 | 6/1932 | Sparkes | 73/66 |
| 4,687,536 | 8/1987 | Hiramatsu et al. | 156/556 |
| 4,882,635 | 11/1989 | Sanai | 360/109 |
| 4,982,295 | 1/1991 | Yakuwa et al. | 360/77.04 |
| 5,012,372 | 4/1991 | Saito | 360/107 |
| 5,166,917 | 11/1992 | Decoster et al. | 360/99.02 |
| 5,204,849 | 4/1993 | Yamada et al. | 360/99.02 |

Primary Examiner—Richard Chilcot
Assistant Examiner—Max H. Noori
Attorney, Agent, or Firm—Ronald P. Kananen

[57] ABSTRACT

A rotary drum centering method and apparatus with which it is possible to precisely perform the drum centering of a rotary drum necessary for adjusting magnetic heads thereon and accurately obtain a reference in the height direction of the magnetic heads.

In positioning magnetic heads 200 on a rotary drum D, a rotary drum center used as a reference for positioning the magnetic heads is obtained by detecting the outer circumferential portion of the rotary drum by means of detectors 121.

19 Claims, 14 Drawing Sheets

ROTARY DRUM CENTERING METHOD AND APPARATUS

BACKGROUND OF THE INVENTION

This invention relates to a method of centering rotary drum such as a drum of a VTR rotary drum device.

A VTR rotary drum device comprises an upper drum and a lower drum. For example, the upper drum is a rotary drum and the lower drum is a stationary drum. Some of such upper drums are provided with magnetic heads. VTR rotary drums include the flangeless type rotary drum device shown in FIG. 1 and the flanged type rotary drum device shown in FIG. 2.

The structure of the flanged type rotary drum device shown in FIG. 2 will be briefly explained.

In this figure, the rotary drum device comprises an upper drum 303 and a lower drum 310. The upper drum 303 is fixed to a flange 311 which latter is fixed to a main shaft 305. On the upper drum 303, there are mounted a plurality of magnetic heads 330 and 340.

On the other hand, the lower drum 310 is rotatably mounted on the main shaft 305 by way of bearings 312. Thus, the upper drum 303 is a rotary drum and the lower drum 310 is a stationary drum.

A video signal VS and a drive signal DS are fed to the device. In response to the drive signal DS being fed to a motor 306, the main shaft 305 and the upper drum 303 are rotated by way of the bearings 312.

As a result of a demand for thinner and cheaper rotary drum devices, flangeless type rotary drum devices of the kind shown in FIG. 1 are now becoming the norm.

The structure of the flangeless type rotary drum device shown in FIG. 1 will now be described.

An upper drum D has a bearing housing 159 in which a plurality of bearings 100 are mounted. As a result, the upper drum D is rotatable on the bearings 100 about a main shaft SP with respect to a lower drum UD.

A rotor core 440 of a motor MG is fixed to the upper end of the main shaft SP. A coil 430 is wound around the rotor core 440. The motor drive signal DS is fed to this coil 430.

A plurality of head bases 200 are fixed to the upper drum D and magnetic heads H are mounted on these head bases 200. Further, a rotor core 410 of a rotary transformer 400 is mounted on the upper drum D.

The lower drum UD, on the other hand, is fixed to a base. A stator core 420 of the rotary transformer 400 is fixed to this lower drum UD. The video signal VS is exchanged between the rotor core 410 and the stator core 420 in a non-contact fashion. This arrangement enables the magnetic heads H to record signals on the VTR tape and reproduce signals from the VTR tape.

However, with the flanged type rotary drum device shown in FIG. 2, the upper drum 303 is fixed to a base-like flange 311 in the manner described above. To achieve this, the upper drum 303 is provided with a large diameter hole 313 to accommodate the flange 311.

The internal diameter of this hole 313 is 17 mm for a drum for VHS 8 mm video, for example.

Because the rotation of the upper drum 303 must be highly precise, the concentricity, circularity and perpendicularity of the hole 313 with respect to the external diameter of the upper drum 303 and the surface 340 on which the magnetic heads are mounted must be kept to less within ±3 µm.

Consequently, in the process of adjusting the positions of the magnetic heads H and fixing thereof on the upper drum 303 it is necessary to mechanically position the upper drum 303 with the inner diameter of the large hole 313 of the upper drum 303 as a reference using a collet and fix the upper drum 303 after it is so positioned.

In the case of the flangeless type rotary drum device, on the other hand, the bearings 100 are directly mounted inside the bearing housing 159 of the upper drum D.

That is, the bearings 100 are disposed in the internal diameter portion of the upper drum 303 and consequently it is not possible to use a collet to secure the upper drum D in position as is done in the case of the flanged type rotary drum device of FIG. 2.

Therefore, even if the upper drum D is centered using the main shaft SP as a jig, because there is play of, for example, at least 0.5 µm in the bearings 100, in practice it is not possible to center the upper drum D with the required degree of accuracy.

This centering of the upper drum D is extremely important for the adjustment of the mounting positions of the heads H on the upper drum D as described above.

Consequently, with the flangeless type rotary drum device of FIG. 1, especially in the case of an upper drum having bearings, it is necessary to center the upper drum D using the boss of the bearing housing 159 or the outer circumferential portion of the upper drum D as a reference.

Further, as a reference in the height direction (the main shaft SP direction) of the magnetic heads H with respect to the upper drum D, it is necessary to use the magnetic head mounting surface of the upper drum D as a reference. In other words, high precision in the magnetic head height is also required.

Accordingly, it is an object of this invention to provide a rotary drum centering method with which it is possible to precisely perform the drum centering of a rotary drum necessary for adjusting magnetic heads thereon and accurately obtain a reference in the height direction of the magnetic heads, and an apparatus used therefor.

Another object of this invention is to provide a method for centering a rotary drum for positioning of magnetic heads thereon wherein the rotary drum is held in a predetermined position, the position of an outer circumferential portion of the rotary drum is detected by a detector and the centering position of the rotary drum is calculated on the basis of the detected out circumferential portion of the drum.

Still another object of this invention is to provide a method for centering a rotary drum for positioning of magnetic heads thereon wherein the rotary drum is held in a predetermined position and a target portion of the rotary drum concentric with an outer circumferential portion of the rotary drum is pressurized so that the center of the rotary drum coincides with a predetermined reference axis.

A further object of this invention is to provide a method for centering a rotary drum for positioning of magnetic heads thereon wherein the rotary drum is held in a predetermined position and is rotated about a predetermined reference axis and a target portion of the rotary drum which is concentric with an outer peripheral portion of the drum is adjusted via tapping until it is exactly centered with respect to the predetermined axis.

A still further object of this invention is to provide an apparatus for centering a rotary drum for positioning of magnetic heads thereon which apparatus comprises means for holding the rotary drum, a detector for detecting the position of an outer peripheral portion of the rotary drum and means for calculating the center position of the drum as a centering position of the drum.

A yet still further object of this invention is to provide an apparatus for centering a rotary drum for positioning of magnetic heads thereon which apparatus comprises means for holding the rotary drum, means for rotating the rotary drum about a predetermined reference axis and means for tapping a target portion of the rotary drum concentric with the outer peripheral portion of the drum.

With the above constitution, centering of the rotary drum is performed by the detectors detecting the outer circumferential portion of the rotary drum or by using the pressurizing means or the tapping means to center the rotary drum mechanically.

DETAILED DESCRIPTION OF THE PREFERRED EMBODIMENTS

Preferred embodiments of the invention will now be described in detail with reference to the accompanying drawings.

Because the embodiments described below are preferred specific examples of embodiments of the invention, various technically preferable limitations are attached thereto; however, except where specifically stated otherwise in the following description, the scope of the invention is not limited to these embodiments.

First Preferred Embodiment

Figure 3:
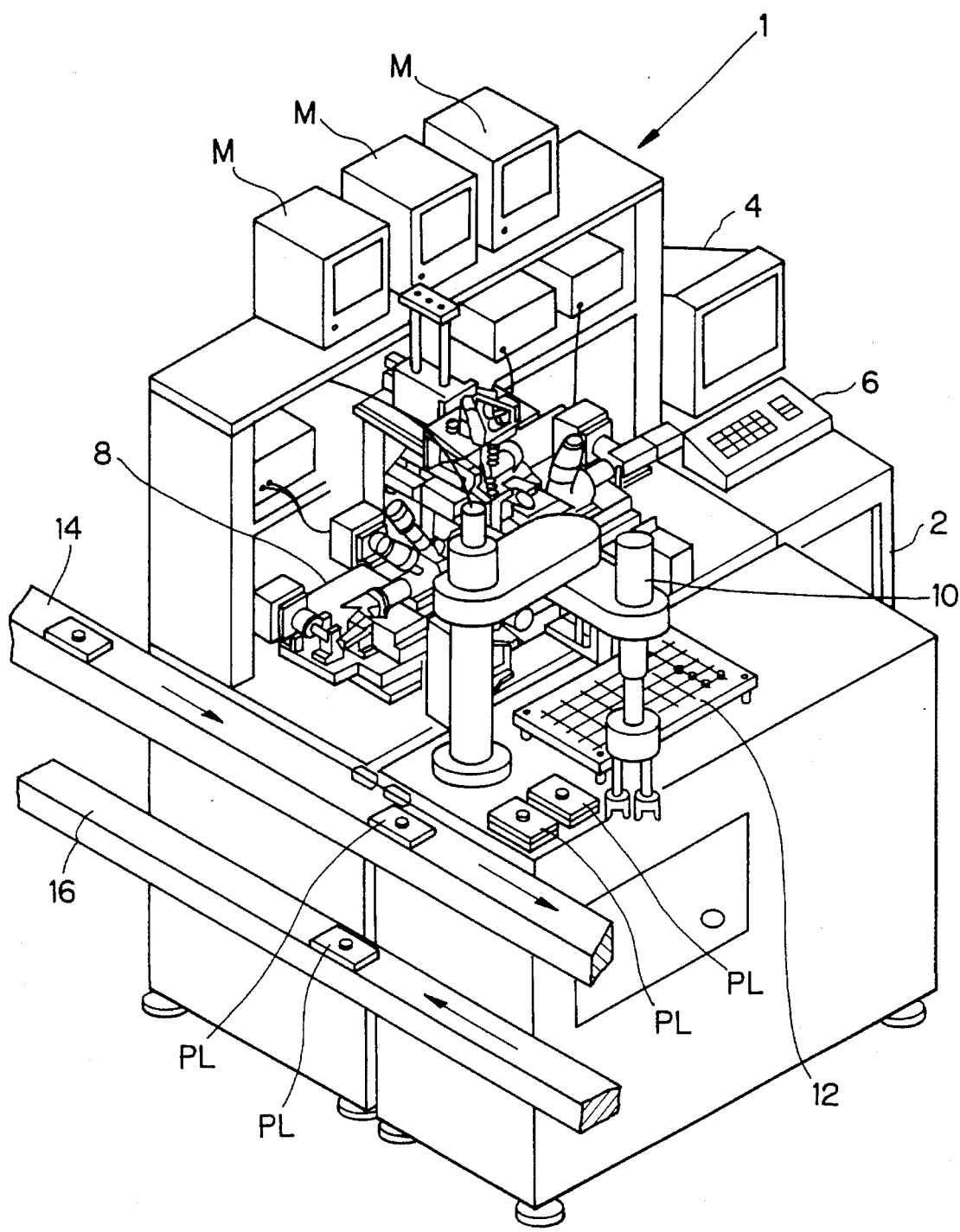
FIG. 3 is a perspective view of an adjusting machine including a rotary drum centering apparatus according to this invention.

FIG. 3 shows a head adjusting machine 1 including a rotary drum centering apparatus according to the invention.

The adjusting machine 1 shown in FIG. 3 has the following constitution:

This adjusting machine 1 is an adjusting apparatus for performing various adjustments such as projecting position adjustment, angular spacing adjustment, attitude adjustment and height checking on magnetic heads (also called video heads) being fitted to a rotary drum (also called upper drum) of a rotary drum device of for example a VTR.

A rotary drum device of a VTR, also called a rotary magnetic head device, comprises for example an upper drum and a lower drum. The upper drum is the rotating-side drum and the lower drum is the stationary-side drum. One or a plurality of heads have to be adjusted on and fixed to this upper drum.

These heads can be used for recording information on a VTR tape or reproducing information recorded on a VTR tape or erasing recorded information.

The adjusting machine 1 shown in FIG. 3 has a rack 2 on which a CRT 4, a keyboard 6, an adjusting machine proper 8, a robot 10, a defective drum table 12, a conveyor 14 and a return conveyor 16, and three camera monitors M are provided.

The conveyor 14 carries platens PL in the direction of the arrow. An upper drum is disposed on each of these platens PL.

The robot 10 transfers upper drums from the platens PL to the adjusting machine proper 8 side and carries adjusted nondefective upper drums or defective upper drums into the adjusting machine proper 8.

Unsatisfactorily adjusted upper drums can be placed on the defective drum table 12 by the robot 10.

The return conveyor 16 moves in a direction opposite to the moving direction of conveyor 14.

Figure 4:
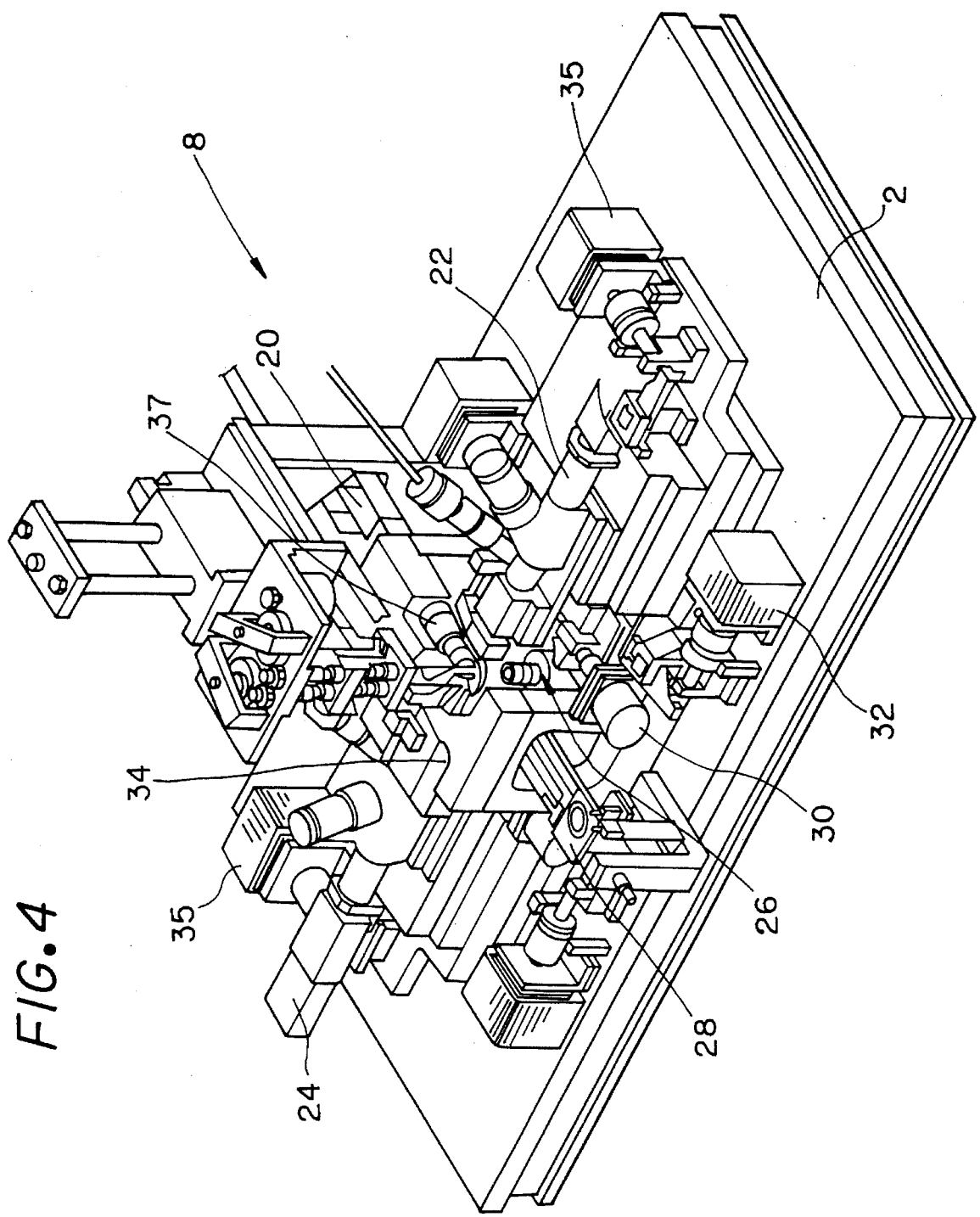
FIG. 4 is a enlarged perspective view of an adjusting machine proper of the adjusting machine shown in FIG. 1.

FIG. 4 is an enlarged view of the adjusting machine proper 8 shown in FIG. 3.

The adjusting machine proper 8 is provided with three CCD cameras 20, 22 and 24. A raising unit 26, a work pull-in unit 28, a head θ shaft 30 and a head angular spacing shaft 32 and the like are also mounted on the rack 2. The adjusting machine proper 8 also has a drum fixing reference base 34, a lens-barrel stage projection-direction drive motor 35 and a 90° spacing microscope 37.

Figure 5:
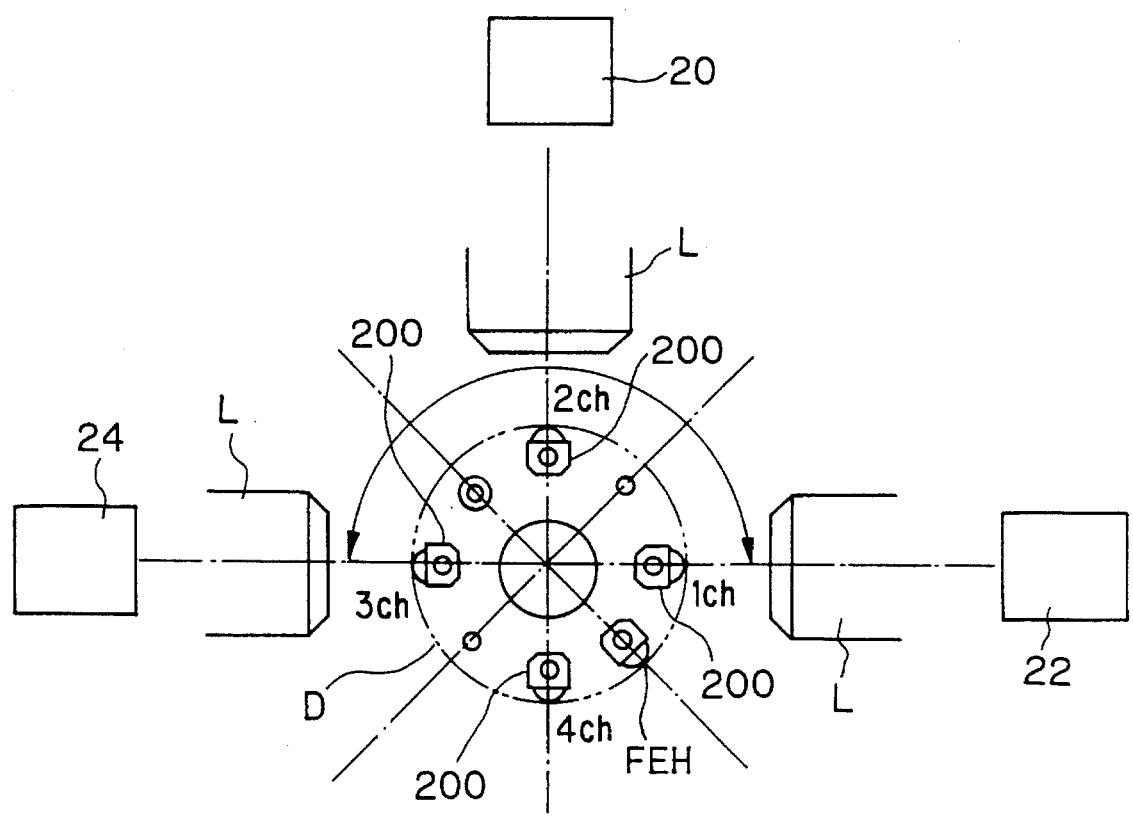
FIG. 5 is a plan view illustrating the disposition of lenses and CCD cameras for monitoring the states of upper heads.

FIG. 5 shows three lenses L corresponding to the three CCD cameras 20, 22 and 24 shown in FIG. 4 and an upper drum D. Four video heads 200 of four channels channel 1 to channel 4 and a flying erase head FEH are shown on the upper drum D. The video heads 200 each have a head tip H.

In FIG. 5, the three lenses L face the video heads 200 of channel 1 to channel 3.

This upper drum D can, for example, be indexed through 90° at a time by indexing means (not shown).

Figure 1:
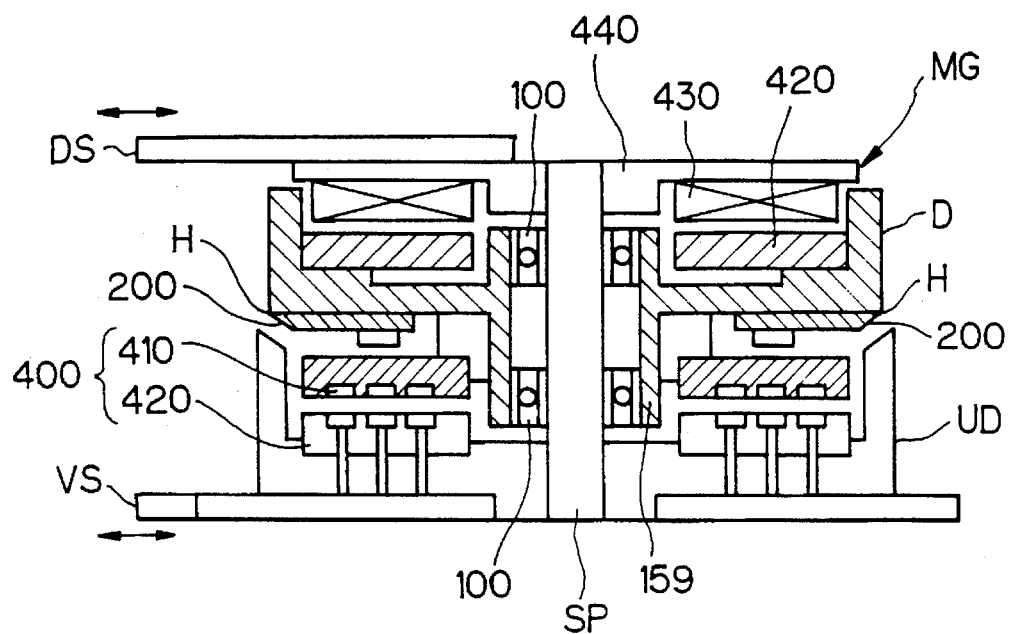
FIG. 1 is a sectional view of an ordinary flangeless type rotary drum device.
Figure 2:
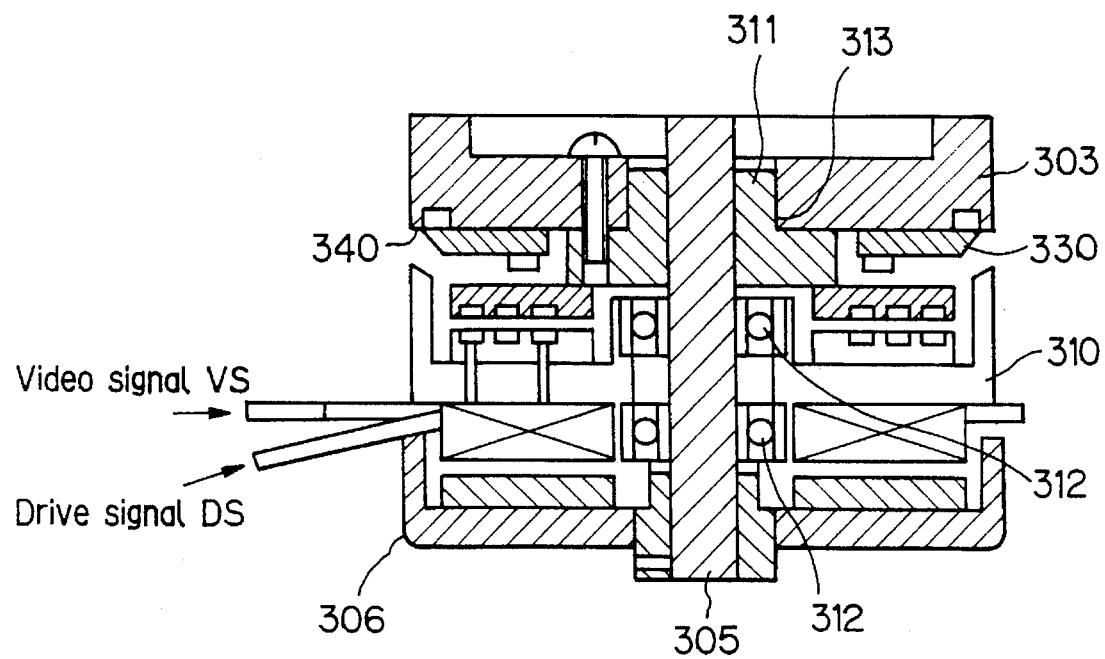
FIG. 2 is a sectional view showing an ordinary flanged type rotary drum device.

The CCD cameras 20, 22 and 24 shown in FIG. 5 are respectively connected to the monitors M shown in FIG. 1, and the gap portions of the head tips H of three of the video heads 200 can be displayed magnified on these monitors M.

Various adjustments such as projection extent adjustment, attitude adjustment, height checking and rotation direction angular division adjustment normally performed on the upper drum D are carried out on these video heads 200. Each of these adjustments is carried out for each facing pair of video heads 200, 200. In the example shown in FIG. 5, the video heads 200,200 of channel 1 and channel 3 are adjusted simultaneously.

The remaining video heads 200, 200 of channel 2 and channel 4 are adjusted in the same way as the video heads 200, 200 of channel 1 and channel 3 by rotative the upper drum D through 90°.

Figure 6:
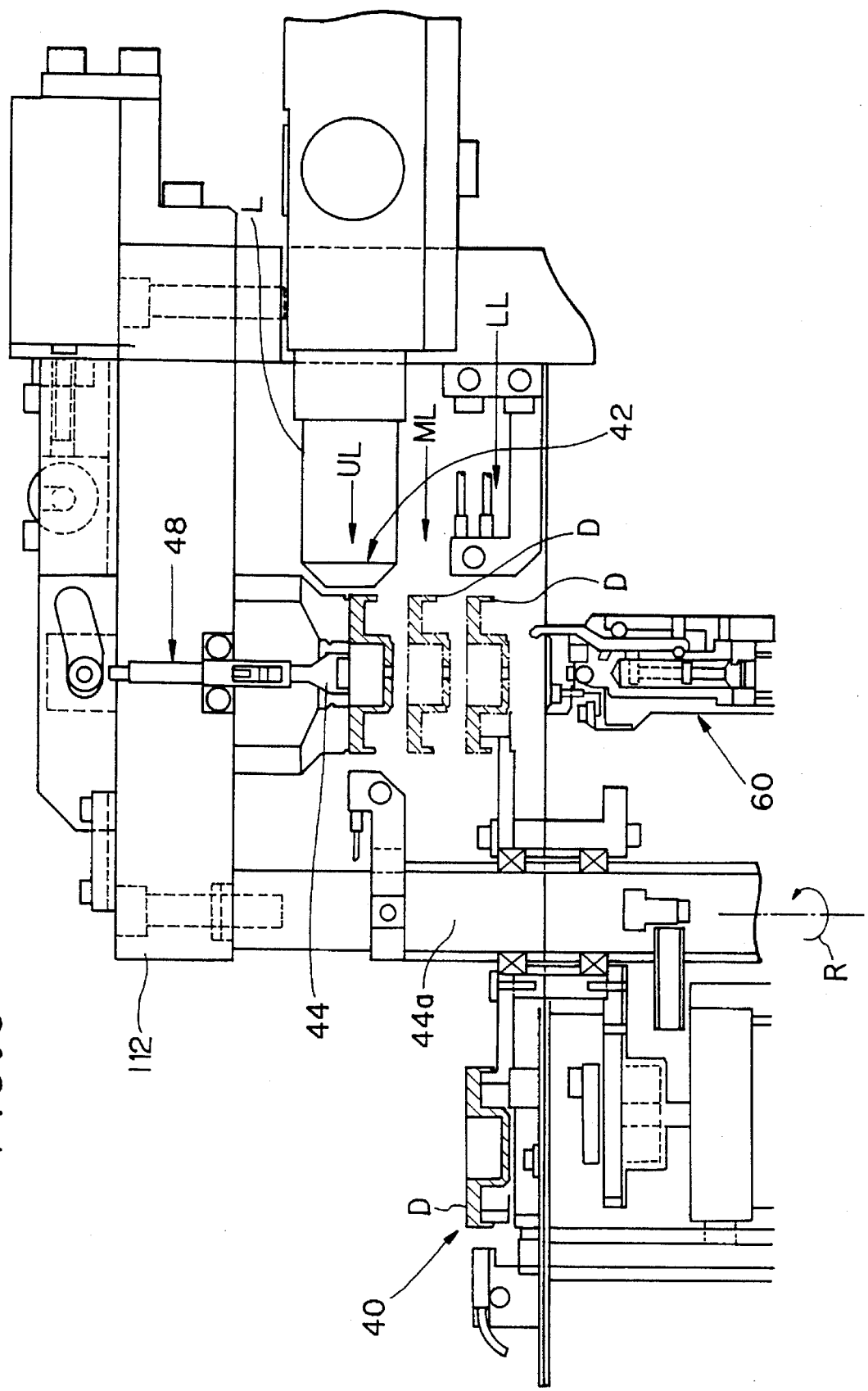
FIG. 6 is a view showing parts which form an upper drum provisional placement section and a upper drum adjusting section.

FIG. 6 shows an upper drum provisional placement section 40 and an upper drum position adjusting section 42.

The robot 10 shown in FIG. 3 sets in the upper drum provisional placement section 40 shown in FIG. 6 an upper drum D as the work on its platen PL. A turning center shaft 44a then rotates through for example 180° in the direction R thereby transferring this upper drum D set in the upper drum provisional placement section 40 to a lower position LL on the ride of the upper drum position adjusting section 42.

Then, by operating a turning and raising device 60 the upper drum D can be raised from the lower position LL shown with broken lines to an intermediate position ML or an upper position UL.

Figure 7:
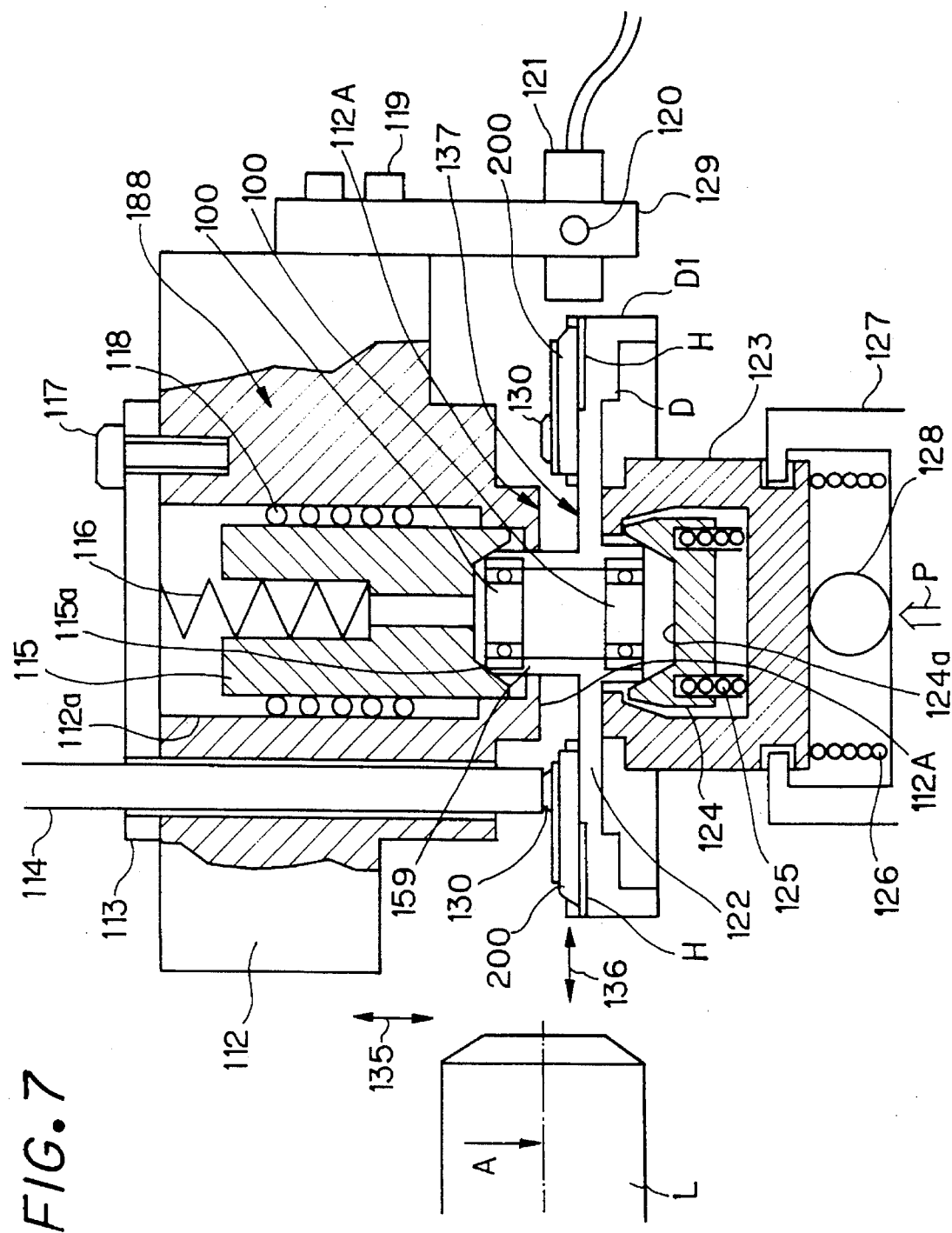
FIG. 7 is a view illustrating a first preferred embodiment of a rotary drum centering apparatus according to this invention, with the apparatus in an initial state wherein an upper drum is not clamped by holding means.
Figure 8:
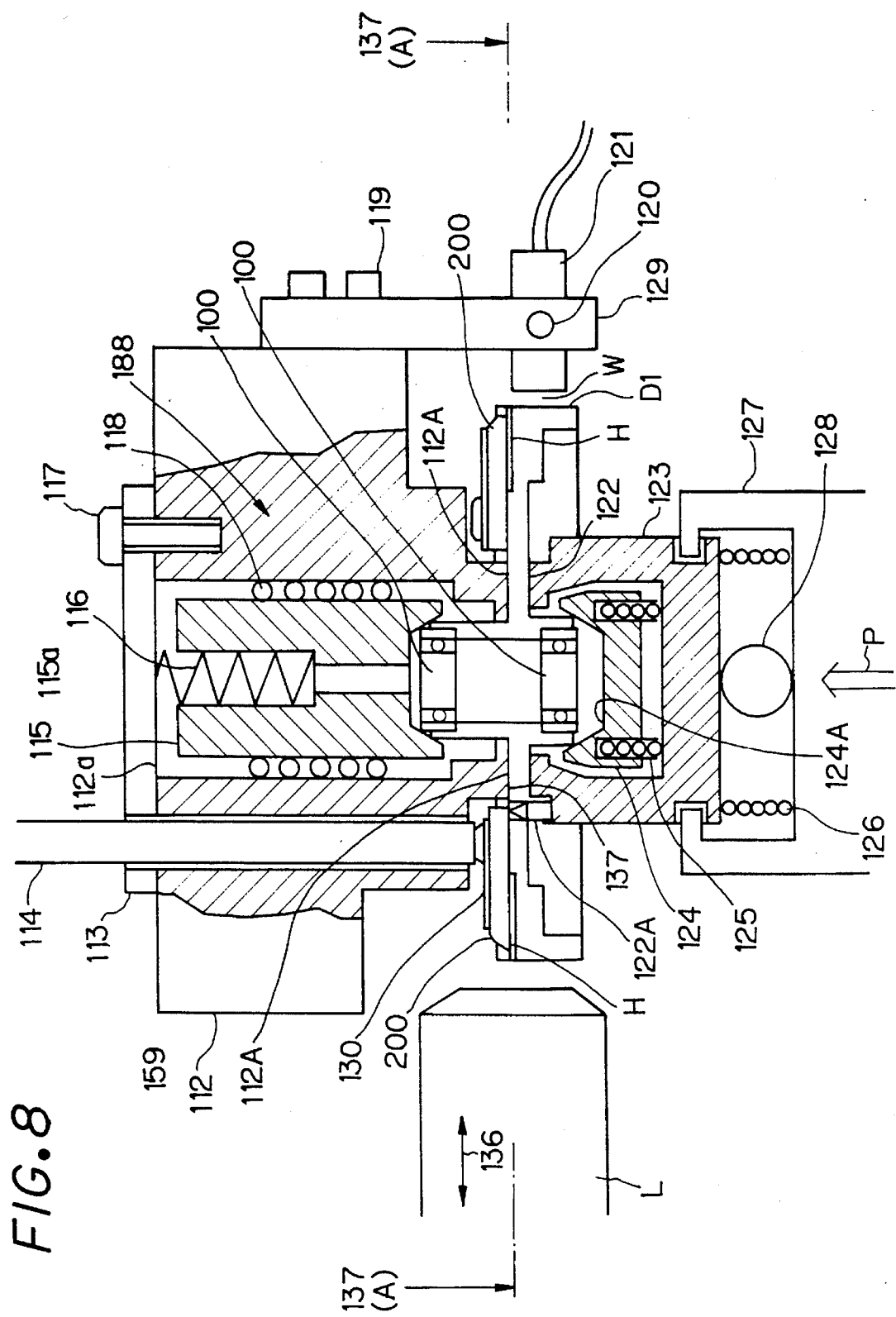
FIG. 8 is a view corresponding to FIG. 7 illustrating a state wherein the upper drum is firmly held by the holding means.

A lever 44, shown in FIG. 6, is for moving the video heads 200 shown in FIG. 7 and FIG. 8 on the upper drum D.

That is, by operating a pin cylinder 48 shown in FIG. 6, the lever 44 can be pushed against the video head 200 which is also called the head base, and can move the video head 200 to the left in the horizontal direction 136 shown in FIG. 7. This pin cylinder 48 is mounted in a top base 112.

In FIG. 6, a lens L is shown positioned facing the upper drum D in the upper drum position adjusting section 42.

FIG. 7 and FIG. 8 show a first preferred embodiment of a rotary drum centering apparatus according to the invention. FIG. 7 shows the state of the apparatus before centering of the upper drum (rotary drum) D is carried out and FIG. 8 shows the state of the apparatus during centering of the upper drum D.

First, the upper drum D set in the rotary drum centering apparatus will be described.

As shown in FIG. 7, the upper drum D has a head mounting surface 137 on which the video heads 200 are mounted, and the four video heads 200 mentioned above are fixed to the head mounting surface 137 by means of screws 130. These screws 130 can be loosened and tightened by a bit 114 being abutted therewith and rotated.

As shown in FIG. 7, the upper drum D is a flangeless type upper drum and has a bearing housing 159 containing bearings 100 and 100.

The rotary drum centering apparatus shown in FIG. 7 and FIG. 8 is provided with a holding member 188 and non-contact sensors 121.

First, the holding member 188 will be described.

The holding member 188 is for holding the head mounting surface 137 at a predetermined position level A. This position level A preferably coincides with the optical axes of the lenses L.

To enable it to position this head mounting surface 137 at the predetermined position level A, the holding member 188 has the following structure:

An upper work guide 115 is disposed in the top base 112 together with a spring 116. This upper work guide 115 is slidably supported in a hole 112a in the top base 112 by linear balls 118. By the linear balls 118 being provided in this way, looseness of the upper work guide 115 in the transverse direction is eliminated.

The upper work guide 115 has a substantially cross-sectionally trapezoidal concave portion 115a on the side of end thereof.

The lower end of the top base 112 has a seating surface 112A for positioning the head mounting surface 137.

Facing this, a raising frame 123 is supported on a raising pusher 127 by a spring 126 and a hard ball 128.

A lower work guide 124 is supported inside the raising frame 123 by a spring 125. A cross-sectionally trapezoidal concave portion 124a is formed in this lower work guide 124.

The concave portion 115a of the upper work guide 115 and the concave portion 124a of the lower work guide 124 sandwich and support the upper and lower end portions of the bearing housing 159 of the upper drum D.

Further, the upper surface of the raising frame 123 can support the underside 122 of the upper drum D.

FIG. 7 shows a state in which the raising frame 123 has not yet ascended. While FIG. 8 shows a state in which the raising frame 123 has ascended.

Thus, the upper drum D is positioned with respect to the vertical direction 135 and the horizontal direction 136 as it is sandwiched between the upper work guide 115 and the lower work guide 124 so that the upper drum D can be centered.

Further, there is provided a phase fixing pin 122A for circumferential, rotational direction positioning of the upper drum D. This phase fixing pin 122A is attached to the raising frame 123.

The screw tightening bit 114 is mounted in the top base 112. This screw tightening bit 114 passes through a stopping plate 113. This stopping plate 113 supports the upper end of the spring 116 and is fixed to the top base 112 by means of screws 117. The bit 114 is for tightening and loosening the screws 130 of the video heads 200 when the positions of the video heads 200 on the head mounting surface 137 are adjusted.

When a screw 130 is loosened, the respective video head 200 can be moved with respect to the head mounting surface 137 in the horizontal direction 136. This movement of the video head 200 in the horizontal direction 136 can be effected by the lever 44 shown in FIG. 6.

The non-contact sensors 121 will now be described, with reference to FIG. 8 and FIG. 9.

In this first preferred embodiment, four non-contact sensors 121 are disposed spaced around and facing the outer periphery D1 of the upper drum D.

Each non-contact sensor 121 is held by a sensor bracket 129 as shown in FIG. 8. As shown in FIG. 8, the sensor brackets 129 are fixed to the top base 112 by means of bracket screws 119. The non-contact sensors 121 are fixed to the sensor brackets 129 by means of sensor fixing screws 120.

Figure 9:
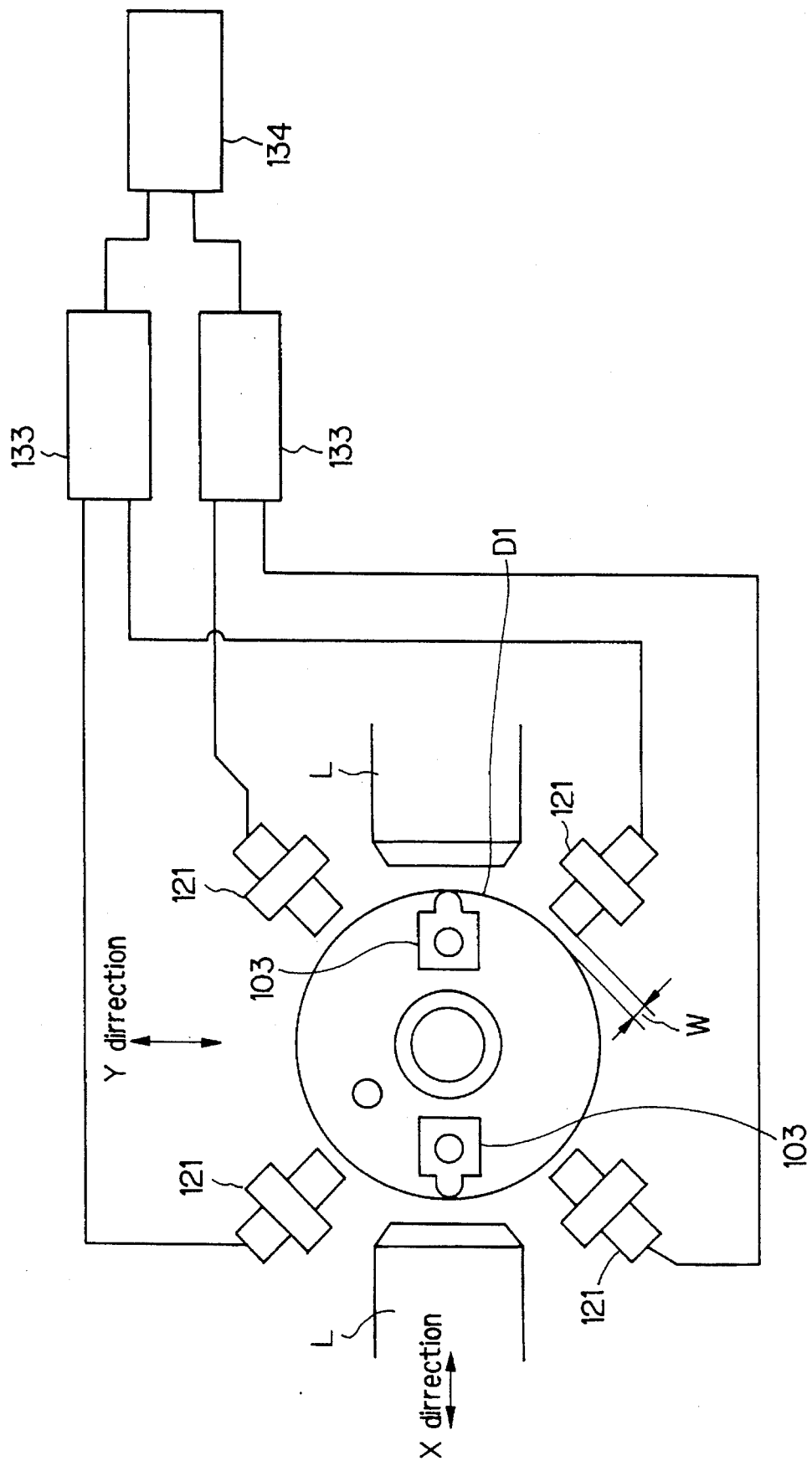
FIG. 9 is a plan view showing the disposition of non-contact sensors and the upper drum taken along A—A line of FIG. 8.

In the state shown in FIG. 8 wherein the head mounting surface 137 of the upper drum D has been positioned at the predetermined position level A, the spacing W shown in FIG. 8 and FIG. 9 between the non-contact sensors 121 and the upper drum D is narrow, at, for example, approximately 0.5 mm.

In order that there is no danger of the upper drum D abutting with the non-contact sensors 121 when the upper drum D is raised from the initial state shown in FIG. 7 to the positioned state shown in FIG. 8, the following measure is adopted:

That is, as mentioned above, the concave portion 115a of the upper work guide 115 and the concave portion 124a of the lower work guide 124 support the corner portions of the upper end and the lower end respectively of the bearing housing 159 with their sloping surfaces.

As a result, when the upper drum D is raised from the state shown in FIG. 7 and held in the state shown in FIG. 8, because these concave portions 115a and 124a perform rough centering of the bearing housing 159 as they raise the drum D, the non-contact sensors 121 do not strike the outer periphery D1 of the upper drum D.

In the centering apparatus shown in FIG. 7, a balancing arrangement wherein the raising frame 123 is suspended from below on the hard ball 128 has been adopted. As a result, by the upper drum D being raised from below, the head mounting surface 137 of the upper drum D can be brought into contact with the seating surface 112A of the top base 112 as shown in FIG. 8.

As shown in FIG. 9, the four non-contact sensors 121 are disposed in facing pairs. That is, the non-contact sensors 121 are all disposed 90° apart from each other. Furthermore, the arrangement is such that the lenses L, L are each positioned between two non-contact sensors 121, 121.

Two facing non-contact sensors 121, 121 are each connected to an operational amplifier 133, and the remaining two facing non-contact sensors 121, 121 are each connected to another operational amplifier 133.

The outputs of these operational amplifiers 133,133 are connected to a center position detecting device 134, and the center position of the upper drum D, i.e. the centering position, can be detected by this center position detecting device 134.

Once this centering position is detected, it can be used as a reference for adjusting the position of the video heads 200 shown in FIG. 8 on the upper drum D. Therefore, even if the upper drum D is not completely centered with respect to the reference axis of the adjusting machine 1, by making the center position of the upper drum D a virtual centering position accurate head positioning can be carried out.

That is, in this preferred embodiment, the center position of the upper drum D with the outer periphery D1 of the upper drum D as a reference is detected and is used as a virtual center position of the upper drum D.

In the preferred embodiment shown in FIG. 7 through FIG. 9, actual determination of the center position of the upper drum D is performed in the following way:

In the initial state shown in FIG. 7, the corner portions of the upper and lower ends of the bearing housing 159 of the upper drum D are sandwiched between, and supported by, the upper work guide 115 and the lower work guide 124. At this time, as shown in FIG. 7, the outer periphery D1 is not facing the non-contact sensors 121.

Next, by raising the raising pusher 127, the taper portion of the concave portion 115a of the upper work guide 115 and the taper portion of the concave portion 124a of the lower work guide 124 gradually sandwich and hold the bearing housing 159 against the force of the springs 116, 125 and 126 while performing rough centering of the upper drum D.

As a result, as shown in FIG. 8, the seating surface 112A and the raising frame 123 support the head mounting surface 137 of the upper drum D and the underside of the upper drum D, respectively, and position the head mounting surface 137 at the predetermined position level A.

When the upper drum D is raised and positioned in this way, there is no danger whatsoever of the outer periphery D1 striking the non-contact sensors 121 for the reason explained above.

In the state shown in FIG. 8, the non-contact sensors 121 face the outer periphery D1 of the upper drum D.

Based on the outputs of the four non-contact sensors 121 shown in FIG. 9, the center position detecting device 134 calculates actual center position of the upper drum D using the outer periphery D1 of the upper drum D as a reference.

Thus, in the first preferred embodiment, the head mounting surface 137 of the upper drum D can be positioned at the predetermined position level A and the center position of the upper drum D can be determined with high precision with the outer periphery D1 as a reference.

Because the head mounting surface 137 of the upper drum D is positioned at the predetermined position level A, this head mounting surface 137 can be used as a reference in the height direction of the video heads 200. As a result, in the state shown in FIG. 9, checking of the height of the video heads 200 on the upper drum D can be carried out easily.

Further, whereas when centering is performed with the conventional main shaft of the rotary drum device as a reference bearing play makes accurate centering impossible, in this first preferred embodiment since it is the outer periphery D1 of the upper drum D having the bearings 100 which is used as a reference, play in the bearings is irrelevant to the centering, and centering of the upper drum D can be carried out accurately.

Second Preferred Embodiment

FIG. 10 through FIG. 13 show a second preferred embodiment of a rotary drum centering apparatus according to the invention.

Figure 10:
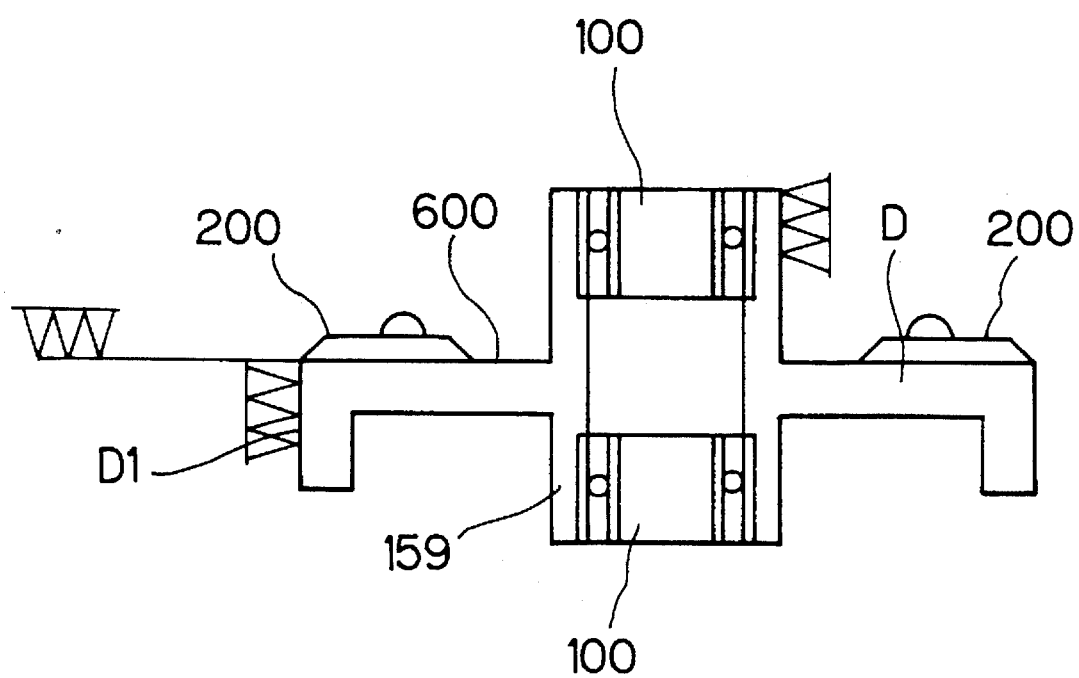
FIG. 10 is a schematic view illustrating a second preferred embodiment of a rotary drum centering apparatus according to the invention.

In this second preferred embodiment, using a method different from that of the first preferred embodiment, centering of an upper drum D is performed in the following way:

That is, in performing centering with the outer periphery of the upper drum D as a reference, use is made of the fact that the same centering effect can be achieved using a portion concentric with the outer periphery D1 as a reference, as shown in FIG. 10. That is, in the second preferred embodiment, the bearing housing 159 of the upper drum D is so machined that it is concentric with the outer periphery D1. Centering of the upper drum D is performed using the peripheral portion of this bearing housing 159 concentric with the outer periphery D1 as a reference.

Figure 13:
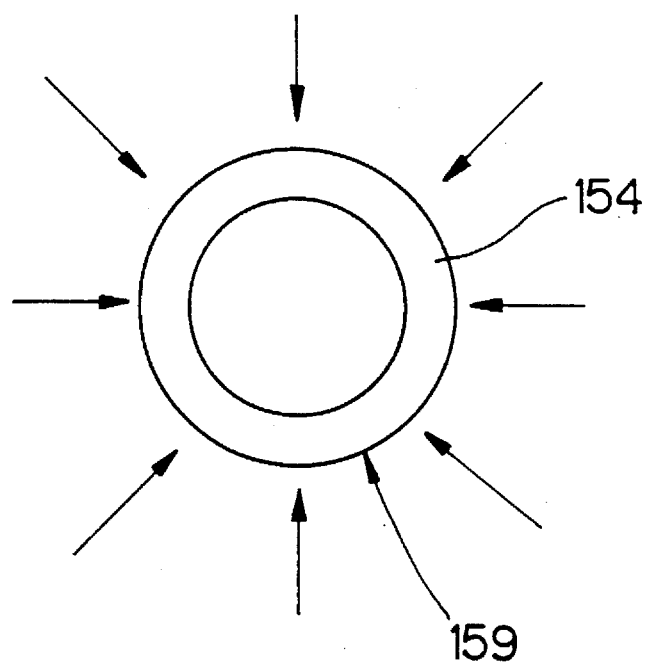
FIG. 13 is a schematic view showing the state of a bearing housing of an upper drum in the second preferred embodiment being pressurized.

This bearing housing 159 is clamped by being pressurized with hydraulic pressure at a location such that pressure is not exerted from outside onto the bearings 100. That is, as shown in FIG. 13, hydraulic pressure is exerted from outside uniformly onto a shell 154 around the bearing housing 159. The thickness of this shell 154 is, for example, approximately 0.2 mm to 0.3 mm.

A bearing housing, also called boss portion, hydraulic pressure clamping technique for realizing this method will now be described with reference to FIGS. 11 and 12.

Figure 11:
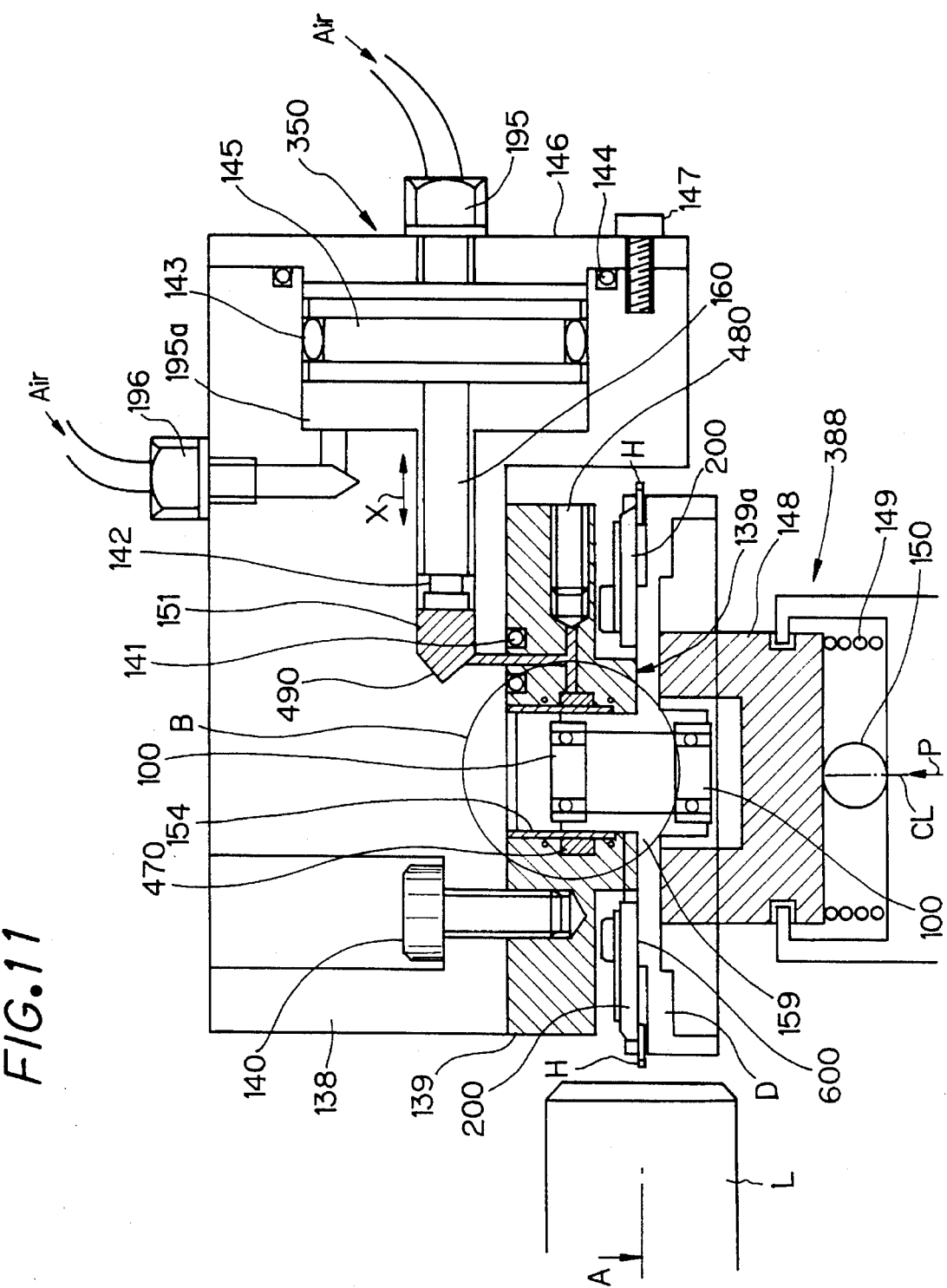
FIG. 11 is a view showing the construction of the apparatus of the second preferred embodiment.

As shown in FIG. 11, the rotary drum centering apparatus of the second preferred embodiment has a holding member 388 and a pressurizing section 350. The holding member 388 holds the upper drum D and the pressurizing section 350 pressurizes the bearing housing 159 of the upper drum D to thereby perform centering of the upper drum D.

First, the pressurizing section 350 will be described.

A seating base 139 is fixed to a top plate 138 with screws.

An air inlet part 196 is connected to the top plate 138. A cylinder 195a is connected to this air inlet part 196. An air piston 145 is disposed inside this cylinder 195a. A seal 142 is fitted to the end of the piston rod 160 of this air piston 145.

Further, a seal 143 is fitted around the air piston 145. The air piston 145 can be moved in the arrow X direction by air introduced through an air inlet part 196. The cylinder 195a is closed off by a cylinder cover 146 sealed by a seal 144 and fixed to the top plate 138 by fixing screws 147.

Referring to FIG. 11, an oil passage 490 is formed in the top plate 138. This oil passage 490 is connected to an oil passage 480 in the seating base 139, shown in FIG. 12. This oil passage 480 is connected to a passage 156 and an annular oil passage 470.

Figure 12:
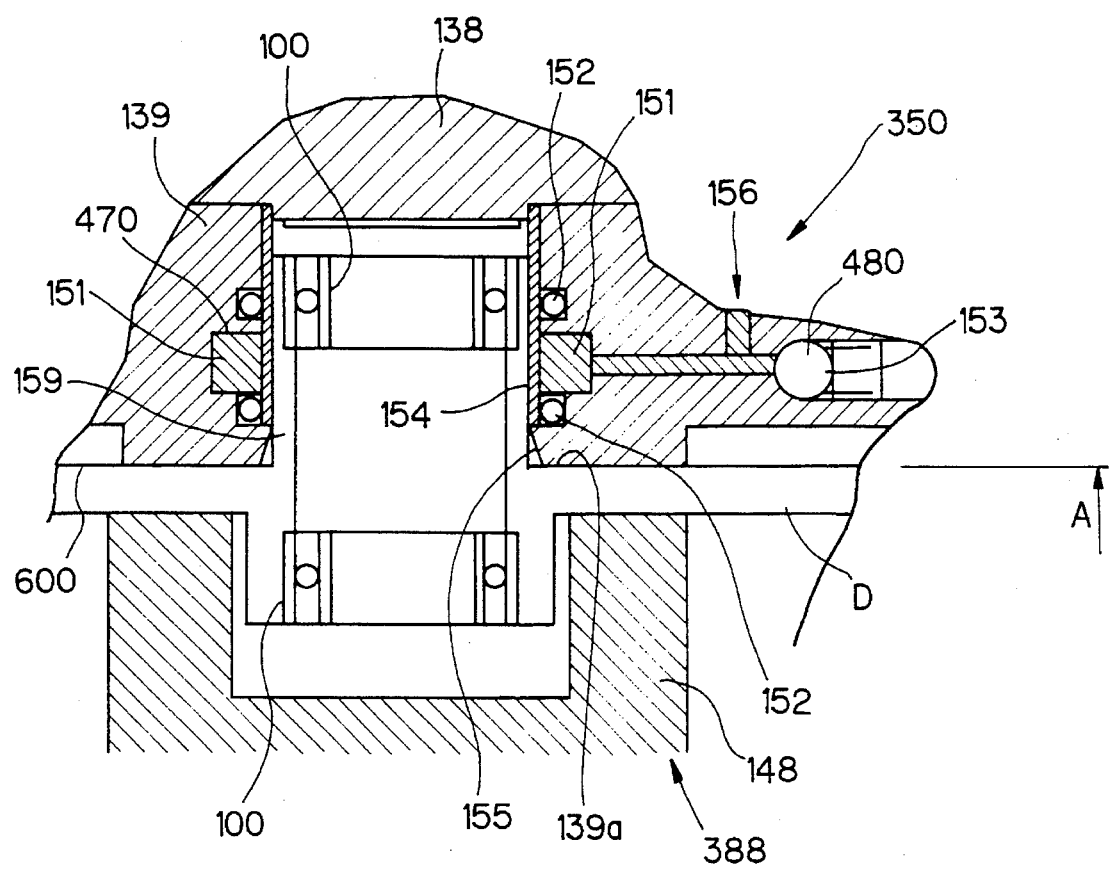
FIG. 12 is an enlarged view of section B of FIG. 11.

Oil 151 in the oil passage 470 shown in FIG. 12 pushes against a cylindrical shell 154. A plug 153 is disposed in the oil passage 480. The seating base 139 is provided with a tapered portion 155. Also, seals 152 are disposed in the seating base 139.

Referring to FIG. 11 and FIG. 12, the upper drum D holding member 388 has the following construction:

The seating base 139 abuts with the video head 200 head mounting surface 600 of the upper drum D. A raising frame 148 abuts with the underside surface of the upper drum D.

As shown in FIG. 11, like the raising frame in the first preferred embodiment this raising frame 148 is supported by a raising hard ball 150 and a spring 149. The raising frame 148 is balanced on the raising hard ball 150, and the upper drum D can be raised by the raising frame 148 so that the head mounting surface 600 of the upper drum D comes into close contact with the seating base 139.

With the upper drum D held by the holding member 388 as shown in FIG. 11 and 10, the bearing housing 159 is pressurized uniformly from therearound through the cylindrical shell 154 by means of the hydraulic pressure from the pressuring section 350.

That is, after the head mounting surface 600 of the upper drum D has been pressed against the seating surface 139a of the seating base 139 from below, the pushing force from below is reduced to zero.

Air is then supplied to the air piston 145 shown in FIGS. 11 and 12, and the oil 151 is pressurized.

As a result of this pressurization of the oil 151, the cylindrical shell 154 is so deformed from the outer side that it swells in the direction of the center axis CL of the upper drum D, the bearing housing 159 is clamped by this cylindrical shell 154, and the upper drum D is thereby centered.

Force is exerted on the piston rod 160 by the air piston 145, the oil 151 is pressurized by way of the seal 142, and the cylindrical shell 154 is uniformly elastically deformed to exert a clamping force on the bearing housing 159.

Because the cylindrical shell 154 is deformed uniformly, the bearing housing 159 can be centered, and as a result, the outer periphery D1 of the upper drum D is centered. This is because the bearing housing 159 and the outer periphery D1 are so machined that they are concentric.

Further, in the above state, the head mounting surface 600 of the upper drum D can be positioned by the seating surface 139a in such a manner that the upper drum D being strongly pushed upward from below by the raising frame 148 and sandwiched between the raising frame 148 and the seating base 139.

Thus, in this second preferred embodiment also, the head mounting surface 600 can be used as a reference in the height direction of the video heads 200 because the head mounting surface 600 of the upper drum D is positioned at the predetermined position level A. As a result, in the state shown in FIG. 11, the height of the video heads 200 on the upper drum D can be checked with ease.

Furthermore, whereas when centering using the conventional main shaft as a reference has been carried out, bearing play has made accurate centering impossible, in the second preferred embodiment, the upper drum D is centered mechanically with the bearing housing 159 concentric with the outer periphery D1 of the upper drum D as reference. As a result, bearing play becomes irrelevant to the centering and mechanical centering of the upper drum D can be performed accurately. That is, the bearing housing 159 is centered by the cylindrical shell 154, which constitutes a jig, being uniformly deformed by hydraulic pressure.

Third Preferred Embodiment

Next, a third preferred embodiment of the rotary drum centering apparatus according to the invention will be described.

In the second preferred embodiment shown in FIG. 10 through FIG. 13, a method in which the bearing housing 159, also called the boss portion, is clamped by means of hydraulic pressure, is employed.

Figure 14:
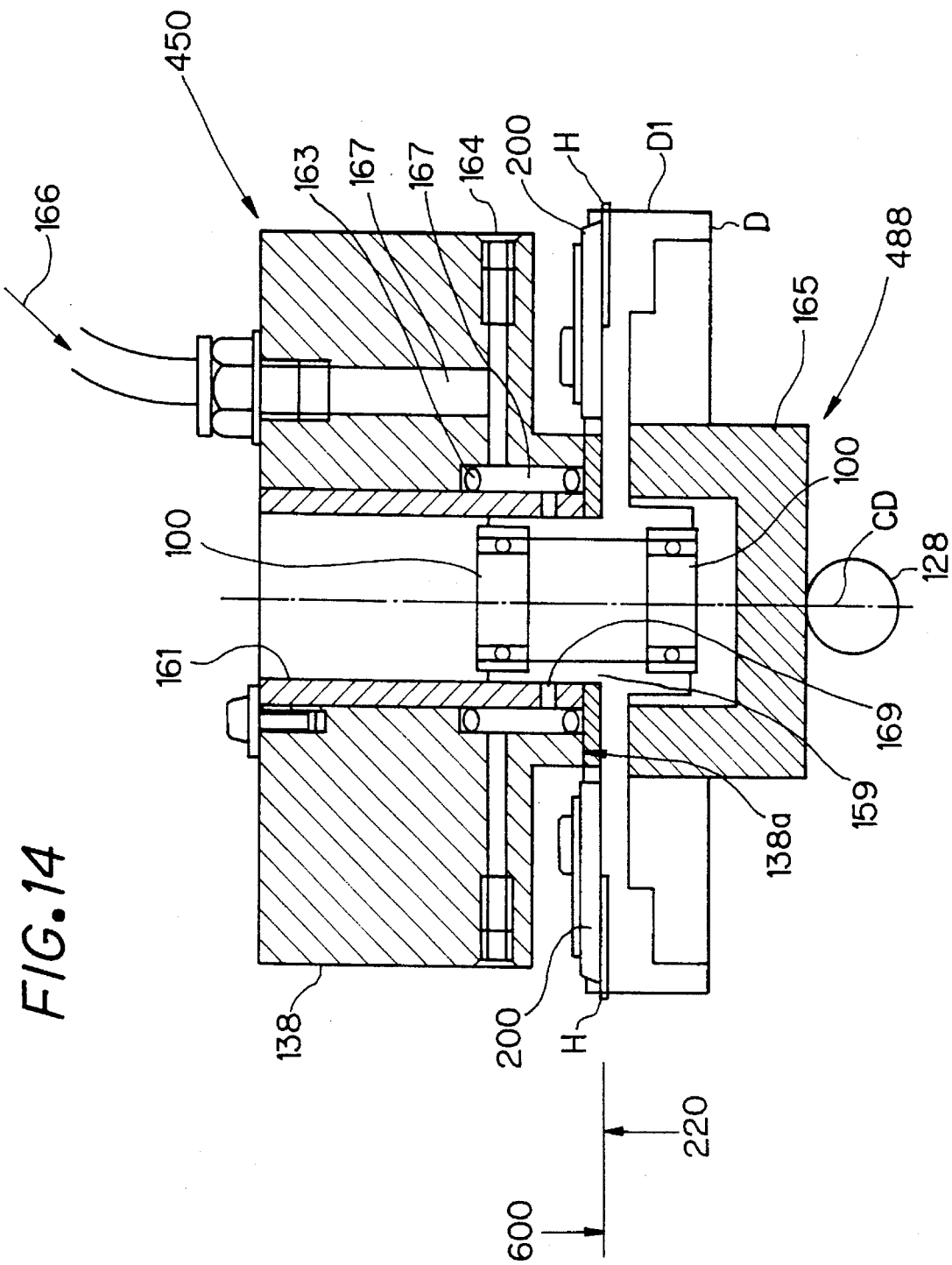
FIG. 14 is a view showing a third preferred embodiment of a rotary drum centering apparatus according to the invention.

However, in the third embodiment shown in FIG. 14, an upper drum D centering method using not hydraulic pressure but pneumatic pressure or an air gauge is employed.

The rotary drum centering apparatus of the third preferred embodiment comprises a holding member 388 and a pressurizing section 450.

The holding member 388 holds and positions the upper drum D on a seating plane 220. The holding member 388 has the following construction:

An air inlet part 166 is connected to a top base 138. This air inlet part 166 is connected to an air passage 167. The air passage 167 is closed off by a plug 164. The air passage 167 leads to the outer peripheral surface of an air gauge 161 and is sealed around the air gauge 161 by seals 163. Air holes 169 in the air gauge 161 are connected to this air passage 167. The center axis of the air gauge 161 coincides with the center axis CD of the upper drum D.

The lower end 138a of the top base 138 abuts with the head mounting surface 600 of the upper drum D.

Facing this, a raising frame 165 is supported by a raising hard ball 128. This raising frame 165 can support the underside of the upper drum D. Thus the head mounting surface 600 and the underside of the upper drum D can be sandwiched between, and held by, the lower end 138a of the top base 138 and the raising frame 165.

A preferably, a plurality of air passages 167 are disposed around the periphery of the bearing housing 159, preferably with a predetermined spacing. When air is introduced through the air inlet part 166, pneumatic pressure is uniformly exerted on the bearing housing 159 via the air passages 167 and the air holes 169. As a result, pneumatic pressure is exerted on the bearing housing 159 through the air holes 169 disposed uniformly therearound, the bearing housing 159 is centered and the upper drum D is positioned.

The upper drum D is raised from below and positioned by the raising frame 165. As a result of this positioning the head mounting surface 600 and the seating plane 220 of the top base 138 are brought into alignment with each other. This seating plane 220 corresponds to the lower end 138a of the top base 138.

In this third preferred embodiment, the bearing housing 159 is thus centered by pneumatic pressure. As described above, since this bearing housing 159 is concentric with the outer periphery D1 of the upper drum D, the result is that centering of the outer peripheral surface of the upper drum D is also achieved.

Further, the head mounting surface 600 of the upper drum D can be positioned with respect to the seating plane 220 by the holding member 388. Therefore, the upper drum D can be certainly and accurately positioned in both the vertical direction and the horizontal direction.

In the second and third preferred embodiments described above, adjustment of the positions of the video head 200 on the upper drum D is carried out after centering of the upper drum D is performed. Where such position adjustment is made the extent to which the heads H project and the like are adjusted by, for example, moving the video heads 200 with respect to the upper drum D with the lever 44 shown in FIG. 6 being pushed against the video heads 200.

As described above, the upper drum of a so-called flangeless type rotary drum apparatus having bearings fitted directly inside the upper drum can be correctly and accurately positioned.

After such upper drum positioning is carried out, adjustment of the positions of the magnetic heads on the upper drum can be accurately performed. That is, the upper drum is centered, and with the head mounting surface on which the magnetic heads are fitted as a reference, the upper drum is fixed.

In this way, the head mounting surface on which the magnetic heads are mounted can be used as a reference in the height direction when the positions of the magnetic heads are adjusted. Therefore, the height direction positioning precision can also be set to a high precision. Further, because centering is carried out using the periphery of the upper drum as a reference or using a portion such as the bearing housing concentric with the periphery as a reference, positioning of the magnetic heads in the horizontal direction (the radial direction of the upper drum) can also be carried out with high precision.

This invention is not limited to the preferred embodiments described above.

Figure 15:
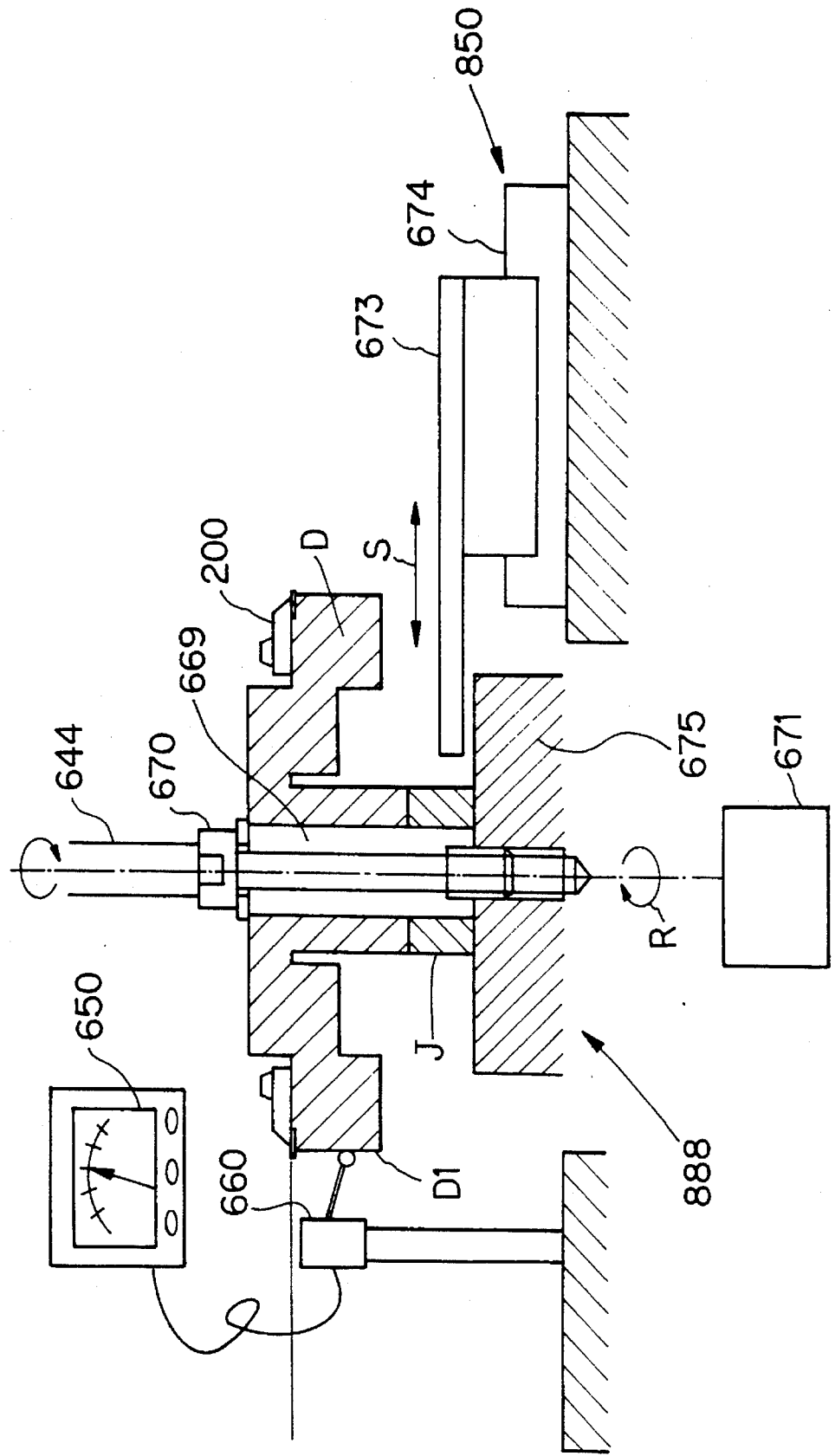
FIG. 15 is a view showing another preferred embodiment of a rotary drum centering apparatus according to the invention.

For example, in FIG. 15 there is shown another preferred embodiment of a rotary drum centering apparatus. This rotary drum centering apparatus comprises a holding member 888 and a striking member 850 which latter is also called a tapping member.

The holding member 888 is constructed as follows:

The upper drum D is fixed to a spindle 675 through a jig J by means of a bolt 670. The upper drum D has a bearing housing 669 which has bearings though not shown in the drawing. The spindle 675 can be rotated in the direction R by a driving device 671.

A sensor 660 consisting of a contact-type electronic micrometer or a non-contact sensor is disposed in the vicinity of the spindle 675. A meter 650 is connected to the sensor 660.

The operation of centering the upper drum D is monitored by this meter 650.

The tapping member 850 which carries out the upper drum D centering operation comprises a tapping jig 673 and a slide base 674. The tapping jig 673 can be moved along the slide base 674 in the S direction by a driving device not shown in the drawings.

This tapping jig 673 centers the upper drum D under the monitoring of the meter 650 by tapping the jig J around the rotating bearing housing 669. By this tapping action, deviation of the outer periphery D1 of the upper drum D can be reduced to less than 0.5 m.

When the upper drum D centering operation is finished, the bolt 670 is tightened with a high torque using a torque driver bit 644, and the bearing housing is thereby fixed to the spindle 675. Adjustment of the positions of the video heads 200 is then started.

Further, although in the preferred embodiments described above it was the rotary drum of a rotary drum device of a VTR which was discussed, the invention is not limited to this but can also be applied to rotary drums of rotary drum devices of apparatuses of other fields.

As described above, with this invention, drum centering of a rotary drum necessary for adjustment of magnetic heads can be carried out with high precision and a reference in the height direction of the magnetic heads can be obtained with accuracy.

What is claimed is:

1. A method for centering a rotary drum comprising the steps of:

holding the rotary drum in a predetermined position;

detecting the position of an outer circumferential portion of the rotary drum using a non-contact type detector means; and calculating a true center position of the rotary drum by using the detected position of the circumferential portion of the rotary drum.

2. A centering method according to claim 1, wherein the non-contact type detector means comprises a plurality of non-contact type detectors which are each disposed in a predetermined position about the rotary drum so as to be facing an outer circumferential portion of the rotary drum.

3. A method for centering a rotary drum for positioning magnetic heads thereon, comprising the steps of:

holding the rotary drum in a predetermined position;

applying a pressure over a circumference of a target portion of the rotary drum which is concentric with an outer circumferential portion of the rotary drum, and for biasing the center of the rotary drum to a position which coincides with a predetermined reference axis; and positioning magnetic heads on the rotary drum while the rotary drum is biased to the position wherein the center of the rotary drum is coincident with the predetermined axis.

4. A method according to claim 3, wherein the applied pressure is applied by means of hydraulic pressure.

5. A method according to claim 3, wherein the applied pressure is applied by means of pneumatic pressure.

6. A method according to claim 3, wherein the target portion of the rotary drum is a boss in which a bearing for the rotary drum is disposed.

7. A method for centering a rotary drum and for positioning a magnetic head thereon, comprising the steps of:

supporting the rotary drum so as to be rotatable about a predetermined reference axis;

tapping a predetermined portion concentric with an outer circumferential portion of the rotary drum to induce adjustment of an axis of the rotary drum to a position wherein it is coincident with the predetermined reference axis; and adjusting a position of a magnetic head while the rotary drum is such that the axis of rotation of the rotary drum and the predetermined axis are coincident.

8. An apparatus for centering a rotary drum for positioning of magnetic heads thereon, comprising:

holding means for centering the rotary drum so that an axis of rotation of the rotary drum and a predetermined axis of rotation are approximately coincident;

detector means for detecting the position of an outer circumferential portion of the rotary drum; and calculating means for calculating a position of the axis of rotation of the rotary drum and for using this calculated position of the axis of rotation of the rotary drum as a virtual centering position for adjusting a position of a magnetic head on said rotary drum.

9. An apparatus according to claim 8, wherein said detector means comprises a plurality of non-contact type detectors which are disposed facing the outer circumferential portion of the rotary drum.

10. An apparatus for centering a rotary drum for positioning of magnetic heads thereon, comprising:

holding means for holding the rotary drum;

pressurizing means for applying pressure to a target portion of the rotary drum which is concentric with an outer circumferential portion of the rotary drum and for biasing the center of the rotary drum to coincide with a predetermined reference axis; and positioning means for positioning magnetic heads on the rotary drum while the rotary drum is biased to the position wherein the center of the rotary drum is coincident with the predetermined axis by said pressurizing means.

11. An apparatus according to claim 10, wherein the pressurizing means applies pressure to the target portion by means of hydraulic pressure.

12. An apparatus according to claim 10, wherein the pressurizing means applies pressure to the target portion by means of pneumatic pressure.

13. An apparatus according to claim 10, wherein the target portion is a boss for holding a bearing of the rotary drum.

14. A centering apparatus according to claim 10, wherein the holding means holds a mounting surface of the rotary drum on which magnetic heads are mounted against a predetermined reference surface to locate the mounting surface at a predetermined height.

15. An apparatus for centering a rotary drum so that a magnetic head is positioned thereon, comprising:

holding means for holding the rotary drum;

means for rotating the rotary drum about a predetermined reference axis;

means for sensing the position of a peripheral surface of the rotary drum; and tapping means for tapping a target portion of the holding means which is concentric with an outer circumferential portion of the rotary drum and for inducing the rotary drum to move radially with respect to the predetermined axis of rotation until an axis of rotation of the rotary drum becomes coincident with the predetermined reference axis and assumes a position wherein a magnetic head can be accurately positioned on the rotary drum.

16. A method according to claim 1, further comprising the step of using the calculated center position for adjustment of apparatus associated with the rotary drum.

17. A method according to claim 16, wherein said apparatus comprises a magnetic head.

18. A method according to claim 1, wherein said step of holding includes supporting the rotary drum on a holding structure which biases the rotary drum to a position wherein a center of the rotary drum is roughly centered with respect to a predetermined axis and wherein interference between the rotary drum and the non-contact type sensor means is avoided.

19. A method according to claim 18, wherein said step of holding further includes the step of moving said rotary drum into abutment with a seating surface in a manner which locates a surface of the rotary drum on which magnetic heads are supported, at a predetermined height in a direction parallel to the predetermined axis whereat the magnetic heads may be observed by way of camera means.

* * * * *